US010268239B2

(12) United States Patent
Park et al.

(10) Patent No.: US 10,268,239 B2
(45) Date of Patent: Apr. 23, 2019

(54) FIRST ELECTRONIC DEVICE, A SECOND ELECTRONIC DEVICE, A THIRD ELECTRONIC DEVICE AND METHOD FOR PROVIDING EXTENSION OF FUNCTION BY DOCKING

(71) Applicant: Samsung Electronics Co., Ltd., Gyeonggi-do (KR)

(72) Inventors: Jin Park, Suwon-si (KR); Han-Kil Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 15/135,314

(22) Filed: Apr. 21, 2016

(65) Prior Publication Data
US 2016/0313764 A1 Oct. 27, 2016

(30) Foreign Application Priority Data

Apr. 21, 2015 (KR) ........................ 10-2015-0056181

(51) Int. Cl.
G06F 13/00 (2006.01)
G06F 1/16 (2006.01)
G06F 13/40 (2006.01)

(52) U.S. Cl.
CPC ........ G06F 1/1632 (2013.01); G06F 13/4081 (2013.01)

(58) Field of Classification Search
CPC .................... G06F 1/1632; G06F 13/4081
See application file for complete search history.

(56) References Cited

U.S. PATENT DOCUMENTS

| 9,629,220 | B2* | 4/2017 | Panopoulos | H05B 37/0209 |
| 2003/0071791 | A1* | 4/2003 | Hanson | G06F 1/1601 |
| | | | | 345/169 |
| 2012/0194976 | A1* | 8/2012 | Golko | G06F 1/163 |
| | | | | 361/679.01 |
| 2012/0331200 | A1* | 12/2012 | Smith | G06F 1/1632 |
| | | | | 710/303 |
| 2013/0163195 | A1* | 6/2013 | Pelletier | G06F 1/1656 |
| | | | | 361/679.55 |

(Continued)

FOREIGN PATENT DOCUMENTS

GB 2479739 A * 10/2011 ........... G06F 1/1632

OTHER PUBLICATIONS

Romo, "A Toy That Everyone Wishes to Have Just One-Smartphone Controlled Toy", http://navercast.naver.com/magazine_contents.nhm?rid=1103&contents_id=52069., Internet Brief, May 2011, 2 pgs.

*Primary Examiner* — Jing-Yih Shyu

(57) ABSTRACT

A first electronic device comprises a body, a docking portion that is provided on the body and is detachably coupled to the second electronic device, a terminal that comes into contact according to the coupling of the second electronic device, and a controller that identifies the coupling to the second electronic device, determines the basic performance of the second electronic device, determines the extended performance that can be provided by the first electronic device based on the basic performance of the second electronic device, and controls the second electronic device according to the basic performance of the second electronic device and the extended performance.

18 Claims, 9 Drawing Sheets

(56) References Cited

U.S. PATENT DOCUMENTS

| | | |
|---|---|---|
| 2014/0008496 A1 | 1/2014 | Ye et al. |
| 2014/0244078 A1 | 8/2014 | Downey et al. |
| 2014/0254896 A1* | 9/2014 | Zhou ............... B25J 9/0006 382/124 |
| 2014/0282103 A1* | 9/2014 | Crandall ........... H04L 65/403 715/753 |
| 2014/0297067 A1* | 10/2014 | Malay ................ G01C 9/005 701/4 |
| 2015/0051715 A1 | 2/2015 | Reedman |
| 2016/0282915 A1* | 9/2016 | Lombardi ............ G06F 1/206 |

* cited by examiner

FIRST ELECTRONIC DEVICE, A SECOND ELECTRONIC DEVICE, A THIRD ELECTRONIC DEVICE AND METHOD FOR PROVIDING EXTENSION OF FUNCTION BY DOCKING

CROSS-REFERENCE TO RELATED APPLICATION AND CLAIM OF PRIORITY

The present application is related to and claims benefit under 35 U.S.C. § 119(a) to Korean Application Serial No. 10-2015-0056181, which was filed in the Korean Intellectual Property Office on Apr. 21, 2015, the entire content of which is hereby incorporated by reference.

TECHNICAL FIELD

Various embodiments of the present disclosure relate to a method of extending functions by docking and to an electronic device for the same.

BACKGROUND

Recently, drones have been used for broadcast shootings, environmental protection, or disaster prevention, as well as for reconnaissance in military fields. Furthermore, the drones are extending their base to logistics and personal hobbies.

Commercially miniaturized drone may provide various functions (such as being used as toys, taking selfies, and playing games), and studies on technology area in progress, in which a plurality of drones performs a complicated cooperation mission at the same time by sharing roles.

In addition, the drones may provide an autonomous flight control function as well as a wireless control function by which the user manually controls the drones. Furthermore, the drone may adopt various sensors (such as an acceleration sensor, a gyro sensor, a pressure sensor, an ultrasonic sensor, or an image sensor) and may communicate with external electronic devices through a short-range communication in order to thereby perform a complex mission.

However, since the drones that are miniaturized to a palm-size tend to use most of a battery for flight, there may be a limitation in processing a lot of computations to control the drones. In addition, the lot of computations is required in order to provide all functions that satisfy user's desire, so a provision of a high-performance processor and various sensors may be expensive. If the lot of computations is performed through a wireless communication, a delay due to a data communication may bring undesirable problems such as a malfunction of the drone or a failure of flight.

Meanwhile, recently, electronic devices have been developed into wearable devices such as electronic watches (e.g., smart watches), head-mounted displays (HMD) (e.g., electronic glasses), electronic shoes, electronic garments, or electronic tattoos, as well as hand-held devices, such as tablet computers or smart phones. In addition, such wearable devices are equipped with a high-performance processor, a camera, a memory, a battery, and/or a display. In particular, the wearable devices may include an acceleration sensor, a gyro sensor, a pressure sensor, an ultrasonic sensor, and/or an image sensor, and may access the Internet through the wireless communication or by interworking with portable electronic devices in order to thereby use various services.

SUMMARY

To address the above-discussed deficiencies, it is a primary object to provide a function extending method and an electronic device for the same, in which a high-performance electronic device may be utilized, in part, as a resource of a low performance electronic device by docking between different types of electronic devices in order to thereby eliminate redundant resources and in order to thereby provide various types of low-priced electronic devices of which the configuration of hardware or the performance of the processor can be minimized, wherein the low-priced electronic device can extend the configuration or functions of hardware by docking with the high-performance electronic device.

According to various embodiments of the present disclosure, a first electronic device may include: a body; a docking portion that is provided on the body and is detachably coupled to the second electronic device; a terminal that comes into contact according to the coupling of the second electronic device; and a controller that identifies the coupling to the second electronic device, determines the basic performance of the second electronic device, determines the extended performance that can be provided by the first electronic device based on the basic performance of the second electronic device, and controls the second electronic device according to the basic performance of the second electronic device and the extended performance thereof.

According to various embodiments of the present disclosure, a second electronic device may include: a body; a docking portion that is provided on the body and is detachably coupled to the first electronic device; a terminal that comes into contact according to the coupling to the first electronic device; and a controller that provides data on the second electronic device through a terminal that comes into contact according to the coupling to the first electronic device, and controls the second electronic device by a control signal of the first electronic device according to the basic performance of the second electronic device and the extended performance thereof, which are determined based on the data.

According to various embodiments of the present disclosure, a third electronic device may include: a communication interface that makes a communication session with the first electronic device for data communication; and a controller that receives, from the first electronic device, a use interface for controlling the second electronic device according to the basic performance of the second electronic device, which is coupled to the first electronic device, and the extended performance thereof, and controls the second electronic device.

According to various embodiments of the present disclosure, the high-performance electronic device may be utilized, in part, as a resource of the low performance electronic device by docking between different types of electronic devices in order to thereby eliminate redundant resources and in order to thereby provide various types of low-priced electronic devices of which the configuration of hardware or the performance of the processor can be minimized. In addition, the low-priced electronic device can extend the configuration or functions of hardware by using the docked high-performance electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
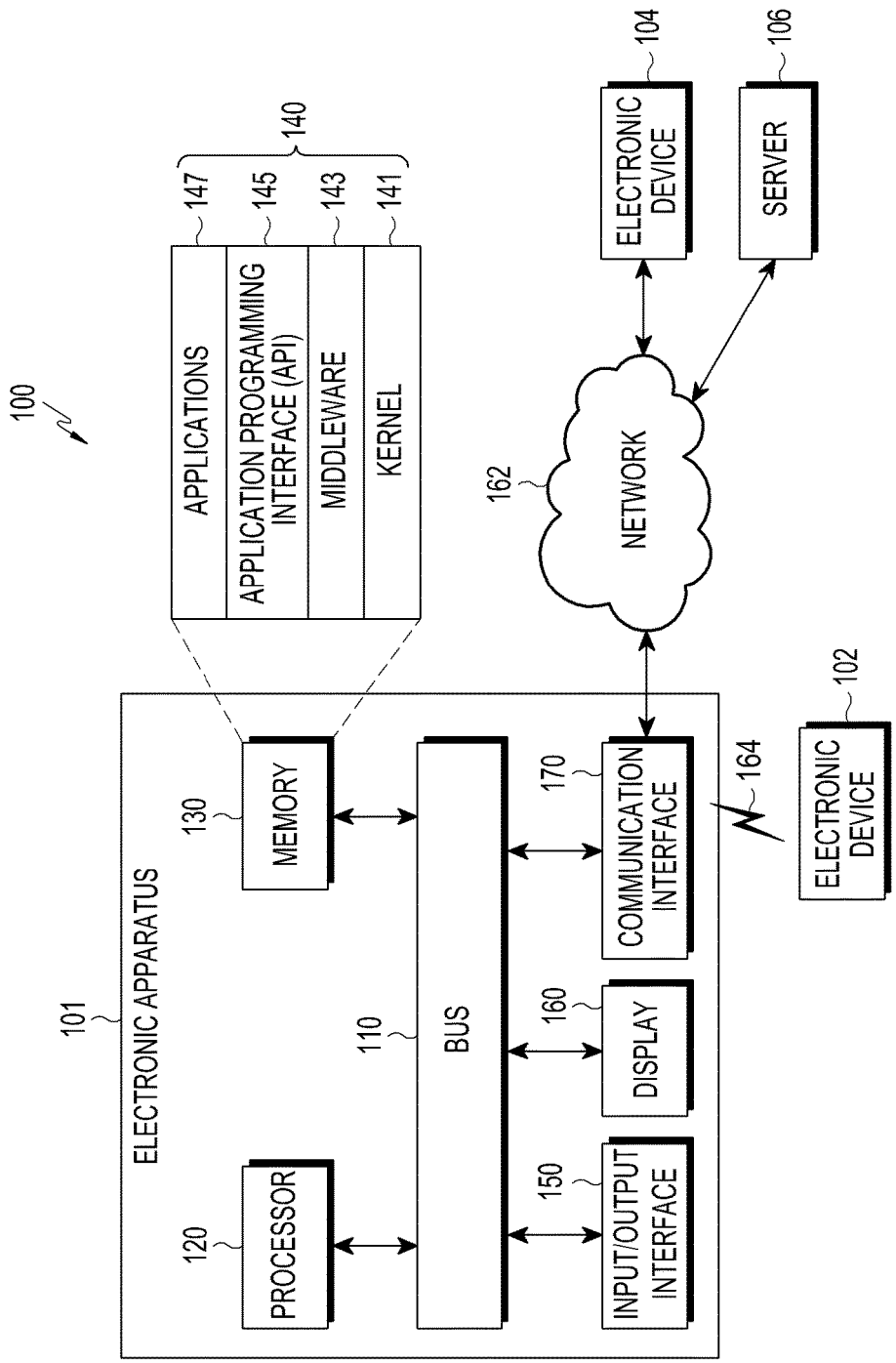
FIG. 1 is a block diagram of an electronic device in a network environment according to various embodiments of the present disclosure.

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or interne device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram showing the electronic device in a network environment according to various embodiments of the present disclosure.

Referring to FIG. 1, an electronic device 101 may include a bus 110, a processor 120, a memory 130, an input/output interface 150, a display 160, and a communication interface 170. According to some embodiments, the electronic device 101 may exclude one or more elements above, or may add other elements thereto.

The bus 110 may include a circuit for connecting the elements with each other and transferring communication data (e.g., control messages and/or data) between the elements.

The processor 120 may include at least one of a central processing unit (CPU), an application processor (AP), or a communication processor (CP). The processor 120, for example, may process a calculation or data related to the control and/or communication of one or more other elements of the electronic device 101.

The memory 130 may include a volatile and/or non-volatile memory. For example, the memory 130 may store instructions or data related to one or more other elements of the electronic device 101. According to an embodiment, the memory 130 may store software and/or programs 140. For example, the programs 140 may include a kernel 141, middleware 143, an application programming interface (API) 145, and/or an application programs (or "applications") 147. At least some of the kernel 141, the middleware 143, or the API 145 may be referred to as an operating system (OS).

The kernel 141 may control or manage system resources (for example, the bus 110, the processor 120, or the memory 130), which are used to execute the operations or functions that are implemented in other programs (for example, the middleware 143, the API 145, or the application programs 147). For example, the kernel 141 may provide an interface by which the middleware 143, the API 145, or the application programs 147 may access each element of the electronic device 101 for control or management.

The middleware 143 may play the intermediate role between the API 145 or the application programs 147 and the kernel 141 to communicate with each other for the transmission and reception of data.

For example, the middleware 143 may process one or more operation requests received from the application programs 147 according to the priority. For example, the middleware 143 may give priority for using the system resources (for example, the bus 110, the processor 120, or the memory 130) of the electronic device 101 to the one or more application programs 147. For example, the middleware 143 may perform scheduling or load-balancing for the one or more operation requests by processing the one or more operation requests according to the priority given to the one or more application programs 147.

The API 145 may include an interface by which the application programs 147 control functions that are provided by the kernel 141 or the middleware 143. For example, the API 145 may include one or more interfaces or functions (e.g., instructions) for file control, window control, image processing, or text control.

The input/output interface 150 may play the role of an interface that transfers instructions or data received from a user or other external devices to other elements of the electronic device 101. For example, the input/output interface 150 may output instructions or data received from the other elements of the electronic device 101 to the user or the other external devices.

The display 160, for example, may include a liquid crystal display (LCD), an LED (light-emitting diode) display, an organic LED (organic light-emitting diode) display, a microelectromechanical system (MEMS) display, or an electronic paper display. For example, the display 160 may display a variety of content (e.g., text, images, videos, icons, symbols, or the like) to the user. The display 160 may include a touch screen, and, for example, may receive a touch input, a gesture input, a proximity input, or a hovering input, by using electronic pens or a user's body part.

The communication interface 170, for example, may configure communication between the electronic device 101 and external devices (e.g., the first external electronic device 102, the second external electronic device 104, or a server 106). For example, the communication interface 170 may be connected to the network 162 through wireless communication or wired communication in order to thereby communicate with the external devices (e.g., the second external electronic device 104 or server 106).

For example, the wireless communication may use, as a cellular communication protocol, at least one of long-term evolution (LTE), LTE Advance (LTE-A), code division multiple access (CDMA), wideband CDMA (WCDA), universal mobile telecommunications system (UMTS), wireless broadband (WiBro), global system for mobile communications (GSM), or the like. In addition, for example, the wireless communication may include a short-range communication 164. The short-range communication 164 may include at least one of WiFi, Bluetooth, NFC, or a GNSS (global navigation satellite system). The GNSS may include at least one of a GPS (global positioning system), a Glonass (global navigation satellite system), the Beidou Navigation Satellite System (hereinafter, "Beidou"), the Galileo, or the European global satellite-based navigation system according to the usage area or bandwidth. In the present specification, "GPS" and "GNSS" may be interchangeably used. For example, the wired communication may include at least one of a universal serial bus (USB), a high definition multimedia interface (HDMI), recommended standard 232 (RS-232), or a plain old telephone service (POTS). The network 162 may include at least one of various telecommunication networks, such as a computer network (e.g., local area network (LAN) or wide area network (WAN)), the Internet, or a telephone network.

The first and the second external electronic devices 102 and 104 may be the same as, or different from, the electronic device 101 in its type. According to an embodiment, the server 106 may include a group of one or more servers. According to various embodiments of the present disclosure, at least some of the operations that are executed in the electronic device 101 may be executed by one or more other electronic devices (e.g., the electronic device 102 or 104, or the server 106). According to various embodiments of the present disclosure, in the case where the electronic device 101 executes a specific function or service automatically or by request, the electronic device 101 may make a request to other electronic devices (e.g., the electronic device 102 or 104, or the server 106) for at least some of the functions related to the function or service additionally or instead of executing the same by itself. The other electronic devices (e.g., the electronic device 102 or 104, or the server 106) may execute the requested function or additional function, and may deliver the result thereof to the electronic device 101. The electronic device 101 may provide the requested function or service by providing the result or by additionally processing the same. To this end, for example, cloud computing, distributed computing, or client-server computing technology may be used.

Figure 2:
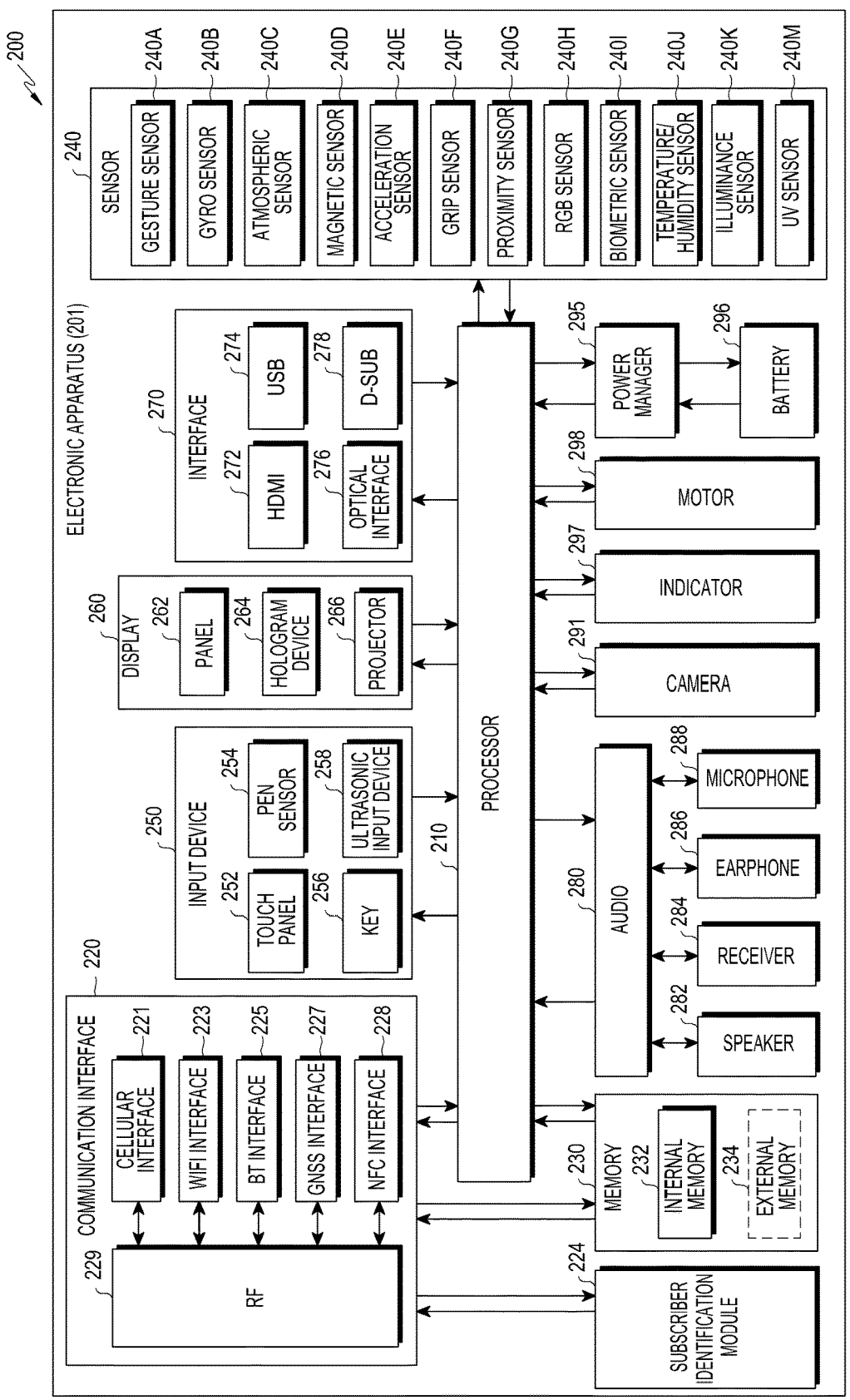
FIG. 2 is a block diagram of an electronic device according to various embodiments of the present disclosure.

FIG. 2 is a block diagram of the electronic device according to various embodiments of the present disclosure.

The electronic device 201, for example, may include all or some of the electronic device 101 shown in FIG. 1. The electronic device 201 may include one or more processors (e.g., application processors (AP)} 210, a communication interface 220, a subscriber identification module 224, a memory 230, a sensor 240, an input device 250, a display 260, an interface 270, an audio 280, a camera 291, a power manager 295, a battery 296, an indicator 297, and a motor 298.

The processor 210 may control a multitude of hardware or software elements connected with the processor 210, and may perform the processing of various pieces of data and a calculation, by performing an operating system or application programs. The processor 210 may be implemented by, for example, a system on chip (SoC). According to an embodiment, the processor 210 may further include a graphic processing unit (GPU) and/or an image signal processor. The processor 210 may include at least some (e.g., a cellular interface 221) of the elements shown in FIG. 2. The processor 210 may load instructions or data received from one or more other elements (e.g., a non-volatile memory) to a volatile memory to then process the same, and may store a variety of data in a non-volatile memory.

The communication interface 220 may have the same, or a similar, configuration as the communication interface 170 of FIG. 1. The communication interface 220, for example, may include a cellular interface 221, a WiFi interface 223, a BT interface 225, a GNSS interface 227, an NFC interface 228, and a radio frequency (RF) module 229.

The cellular interface 221, for example, may provide services of voice calls, video calls, text messaging, or the Internet through communication networks. According to an embodiment, the cellular interface 221 may perform identification and authentication of the electronic device 201 in communication networks by using the subscriber identification module (e.g., a SIM card 224). According to an embodiment, the cellular interface 221 may perform at least some of the functions provided by the processor 210. According to an embodiment, the cellular interface 221 may include a communication processor (CP).

For example, each of the WiFi interface 223, BT interface 225, the GNSS interface 227, or the NFC interface 228 may include a processor for processing data transmitted and received through the corresponding module. According to some embodiments, at least some (e.g., two or more) of the cellular interface 221, the WiFi interface 223, the BT interface 225, the GNSS interface 227, or the NFC interface 228 may be included in one integrated chip (IC) or one IC package.

The RF 229 may transmit and receive data (for example, RF signals). The RF 229 may include, for example, a transceiver, a power amp module (PAM), a frequency filter, a low noise amplifier (LNA), antennas, or the like. According to another embodiment, at least one of the cellular interface 221, the WiFi interface 223, the BT interface 225, the GNSS interface 227, or the NFC interface 228 may transmit and receive RF signals through separated modules.

The subscriber identification module 224 may include a card adopting a subscriber identification module and/or an embedded SIM, and may include inherent identification information (e.g., an integrated circuit card identifier (IC-CID)) or subscriber information (e.g., an international mobile subscriber identity (IMSI)).

The memory 230 (e.g., the memory 130) may include an internal memory 232 or an external memory 234. The internal memory 232, for example, may include at least one of volatile memories (e.g., a dynamic RAM (DRAM), a static RAM (SRAM), a synchronous dynamic RAM (SDRAM), or the like) or non-volatile Memories (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), or the like).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected with the electronic device 201 through various interfaces.

The sensor 240, for example, may measure physical quantities and may detect the operation state of the electronic device 201 to thereby convert the measured or detected information to electric signals. The sensor 240 may include at least one of, for example, a gesture sensor 240A, a gyro-sensor 240B, an atmospheric sensor 240C, a magnetic sensor 240D, an acceleration sensor 240E, a grip sensor 240F, a proximity sensor 240G, a color sensor 240H (e.g., a red-green-blue (RGB) sensor), a biometric sensor 240I, a temperature/humidity sensor 240J, an illuminance sensor 240K, or an ultra violet (UV) sensor 240M. Alternatively or additionally, the sensor 240 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor 240 may further include a control circuit for controlling one or more sensors included therein. In some embodiments, the electronic device 201 may further include a processor, as a part of the processor 210 or separately from the processor 210, which is configured to control the sensor 240, in order to thereby control the processor 210 while the processor 210 is in a sleep mode.

The input device 250, for example, may include a touch panel 252, a (digital) pen sensor 254, keys 256, or an ultrasonic input device 258. The touch panel 252 may use at least one of, for example, a capacitive type, a pressure type, an infrared type, or an ultrasonic type. In addition, the touch panel 252 may further include a control circuit. The touch panel 252 may further include a tactile layer in order to thereby provide a user with a tactile reaction.

For example, the (digital) pen sensor 254 may be a part of the touch panel, or may include a separate recognition sheet. The keys 256 may include, for example, physical buttons, optical keys, or a keypad. The ultrasonic input device 258 detects acoustic waves that are generated in input means through a microphone (e.g., a microphone 288) to thereby identify data corresponding to the acoustic waves.

The display 260 (e.g., the display 160) may include a panel 262, a hologram device 264, or a projector 266. The panel 262 may include the same or similar elements as the display 160 of FIG. 1. The panel 262 may be implemented to be, for example, flexible, transparent, or wearable. The panel 262 may be configured with the touch panel 252 as a single module. The hologram device 264 may display 3D images in the air by using interference of light. The projector 266 may display images by projecting light onto a screen. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 shown in FIG. 1. Additionally or alternatively, the interface 270 may include, for example, a mobile high-definition link (MHL) interface, a secure digital (SD) card/multi-media card (MMC) interface or an infrared data association (IrDA) standard interface.

The audio 280 may convert a sound into an electric signal, and vice versa. At least some elements of the audio 280 may be included, for example, in the input/output interface 150 shown in FIG. 1. For example, the audio 280 may process voice information that is input or output through a speaker 282, a receiver 284, earphones 286, or a microphone 288.

The camera 291 is a device for photographing still and moving images, and, according to an embodiment, the camera 291 may include one or more image sensors (e.g., a front sensor or a rear sensor), lenses, an image signal processor (ISP), or a flash (e.g., an LED or a xenon lamp).

The power manager 295 may manage the power of the electronic device 201. According to an embodiment, the power manager 295 may include a power management integrated circuit (PMIC), a charger integrated circuit (IC), or a battery or fuel gauge. The PMIC may be implemented by a wired charging type and a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be provided. The battery gauge may measure, for example, the remaining power of the battery 296, a charging voltage and current, or temperature. The battery 296 may include, for example, a rechargeable battery or a solar battery.

The indicator 297 may display a specific state, for example, a booting state, a message state or a charging state of the whole or a part (e.g., the processor 210) of the electronic device 201. The motor 298 may convert an electric signal to a mechanical vibration, and may provide a vibration or a haptic effect. Although it is not shown in the drawing, the electronic device 201 may include a processing device (e.g., a GPU) for supporting mobile TV. The processing device for supporting mobile TV may process media data according to standards, such as, for example, digital multimedia broadcasting (DMB), digital video broadcasting (DVB), or media flow. Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
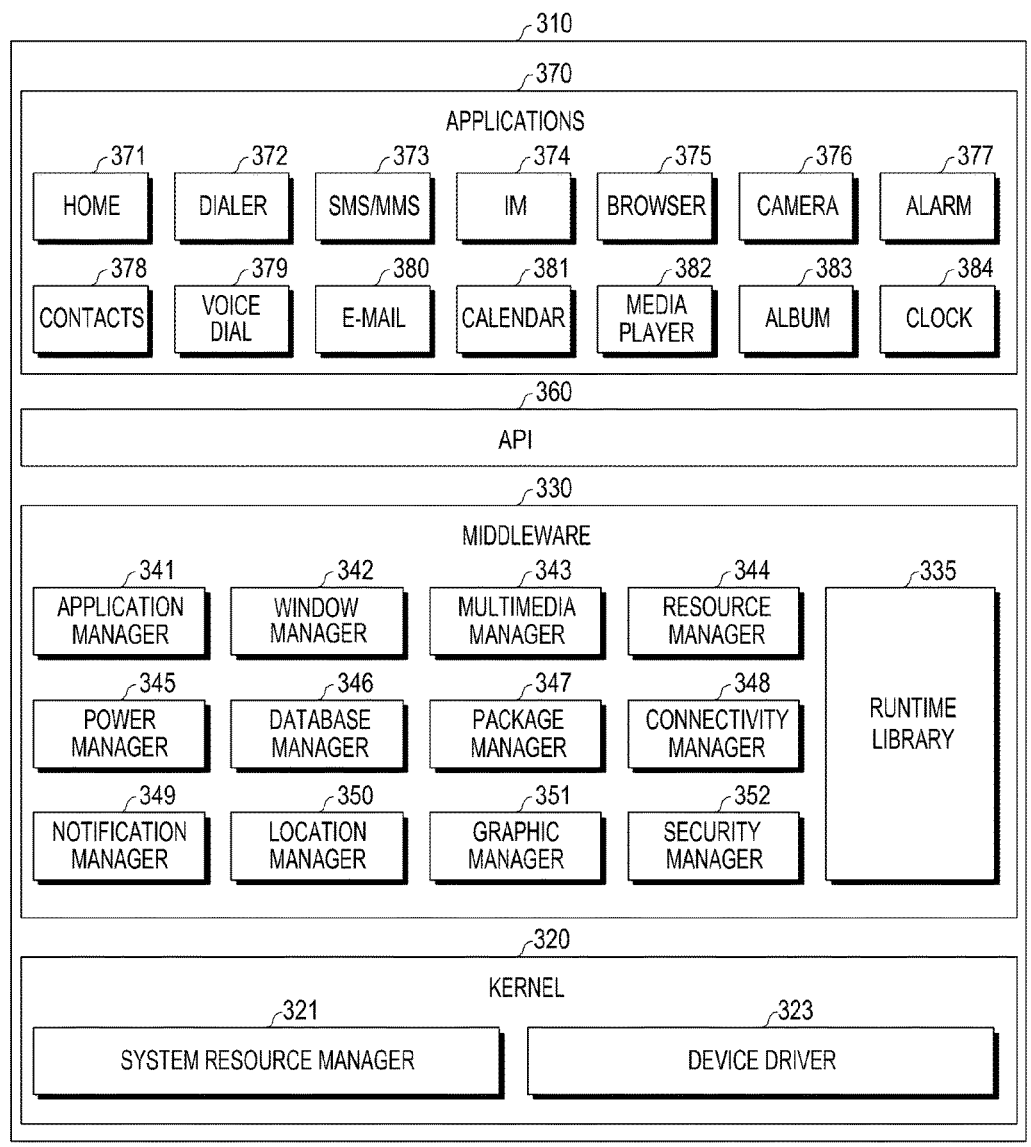
FIG. 3 is a block diagram of a program module according to various embodiments of the present disclosure.

FIG. 3 is a block diagram of a program module according to various embodiments of the present disclosure.

According to an embodiment, the programming module 310 (e.g., the programs 140) may include an operating system (OS) for controlling the resources related to the electronic device (e.g., the electronic device 101) and/or various applications (e.g., the application programs 147), which are executed under the operating system. For example, the operating system may be Android, iOS, Windows, Symbian, Tizen, Bada, or the like.

The programming module 310 may include a kernel 320, middleware 330, an application programming interface (API) 360, and/or applications 370. At least some of the program module 310 may be preloaded in the electronic device, or may be downloaded from external electronic devices (e.g., the electronic device 102 or 104, or the server 106).

The kernel 320 (e.g., the kernel 141), for example, may include a system resource manager 321 and/or a device driver 323. The system resource manager 321 may perform the control, allocation, or collection of the system resources. According to an embodiment, the system resource manager 321 may include a process management unit, a memory management unit, or a file system management unit. The device driver 323 may include, for example, a display driver, a camera driver, a Bluetooth driver, a common memory driver, a USB driver, a keypad driver, a Wi-Fi driver, an audio driver, or an inter-process communication (IPC) driver.

The middleware 330, for example, may provide functions required in common for the applications 370, or may provide various functions to the applications 370 through the API 360 in order to allow the applications 370 to effectively use limited system resources in the electronic device. According to an embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run time library 335, for example, may include a library module that a compiler uses in order to add new functions through programming languages while the applications 370 are executed. The run time library 335 may perform the management of an input/output, the management of a memory, or a function of an arithmetic calculation.

The application manager 341, for example, may manage a life cycle of at least one of the applications 370. The window manager 342 may manage a GUI resource used in the screen. The multimedia manager 343 may identify formats for reproducing various media files, and may perform encoding or decoding of media files by using a codec corresponding to each format. The resource manager 344 may manage resources, such as source codes, memories, or storage spaces of one or more applications 370.

The power manager 345, for example, may manage a battery or power by operating in association with a basic input/output system (BIOS), and may provide power information necessary for the operation of the electronic device.

The database manager 346 may manage to create, retrieve, or change a database that is to be used in one or more applications 370. The package manager 347 may manage the installation or updating of the applications that are distributed in the form of a package file.

The connectivity manager 348, for example, may manage a wireless connection, such as Wi-Fi or Bluetooth. The notification manager 349 may display or notify of events, such as received messages, appointments, or proximity notifications, to the user without disturbance. The location manager 350 may manage location information of the electronic device. The graphic manager 351 may manage graphic effects to be provided to the user or user interfaces related thereto. The security manager 352 may provide a general security function required for the system security or user authentication. According to an embodiment, in the case of the electronic device (e.g., the electronic device 101) adopting a phone call function, the middleware 330 may further include a telephony manager for managing the function of a voice call or a video call of the electronic device.

The middleware 330 may include a middleware module through a combination of various functions of the above-described elements. The middleware 330 may provide a module that is specialized according to the type of operating system in order to provide differentiated functions.

The API 360 (e.g., the API 145), for example, may be a group of API programming functions, and may be provided with a different configuration according to an operating system. For example, one set of APIs may be provided to each platform in the case of Android or iOS, and two or more sets of APIs may be provided to each platform in the case of Tizen.

The applications 370 (e.g., the applications 147) may include one or more applications that execute functions, such as home 371, a dialer 372, SMS/MMS 373, instant messages 374, a browser 375, a camera 376, an alarm 377, contacts 378, voice dial 379, e-mail 380, a calendar 381, a media player 382, an album 383, a clock 384, healthcare (e.g., measuring the amount of exercise or blood glucose), provision of environmental information (e.g., providing atmospheric pressure, humidity, or temperature information), or the like.

According to an embodiment, the applications 370 may include an application that supports the exchange of information between the electronic device (e.g., the electronic device 101) and external electronic devices (e.g., the electronic devices 102 and 104) (hereinafter, referred to as "information-exchange application" for the convenience of explanation). The information-exchange application, for example, may include a notification relay application for relaying specific information to the external electronic devices, or a device management application for managing the external electronic devices.

For example, the notification relay application may include a function of transferring notification information generated in other applications (e.g., the SMS/MMS application, the e-mail application, the healthcare application, or the environmental information application) of the electronic device to the external electronic devices (e.g., the electronic devices 102 and 104). In addition, the notification relay application, for example, may receive notification information from the external electronic devices to then provide the same to the user.

The device management application, for example, may manage (e.g., install, delete, or update) one or more functions (e.g., turning on and off the external electronic device (or some elements) or adjusting the brightness (or resolution) of a display) of the external electronic device (e.g., the electronic device 102 or 104), which communicates with the electronic device, applications executed in the external electronic device, or services (e.g., a phone call service or a messaging service) provided by the external electronic device.

According to an embodiment, the applications 370 may include applications that are designated according to the attribute (e.g., the healthcare application of a mobile medical device) of the external electronic device (e.g., the electronic device 102 or 104). According to an embodiment, the applications 370 may include applications that are received from the external electronic devices (e.g., the server 106, or the electronic devices 102 and 104). According to an embodiment, the applications 370 may include preloaded applications or third party applications that can be downloaded from a server. Names of the elements of the program module 310, according to the above-described embodiments of the present disclosure, may change depending on the type of OS.

According to various exemplary embodiments of the present disclosure, at least some of the program module 310 may be implemented in software, firmware, hardware, or a combination of two or more thereof. At least a part of the program module 310 may be implemented (e.g., executed), for example, by a processor (e.g., the processor 120). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented.

For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4A:
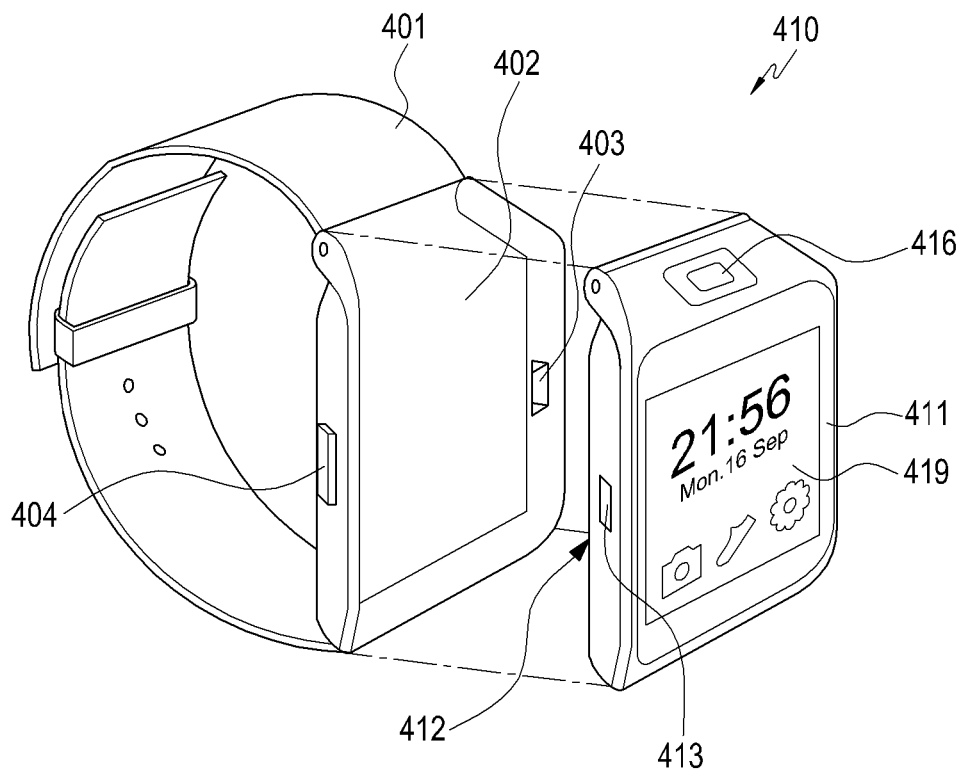
FIG. 4a is a perspective view illustrating an electronic device according to various embodiments of the present disclosure.
Figure 4B:
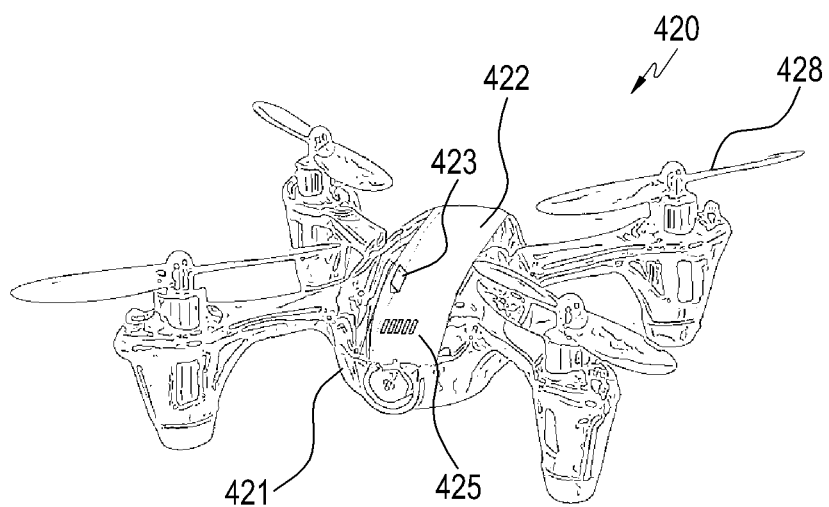
FIG. 4b is a perspective view illustrating an electronic device that is coupled to another electronic device according to various embodiments of the present disclosure.

FIG. 4a is a perspective view illustrating an electronic device according to various embodiments of the present disclosure, and FIG. 4b is a perspective view illustrating an second electronic device that is connected to another electronic device according to various embodiments of the present disclosure Referring to FIG. 4a and FIG. 4b, the first electronic device 410 may be a wearable device that is worn on a user's body part, and may provide specific information through one or more displays 419. In addition, the second electronic device 420 may be various types of devices that are coupled to the first electronic device 410 by docking to then be controlled by the first electronic device 410.

A representative example of the first electronic device 410, according to various embodiments of the present disclosure, may be a wristwatch type of device that is able to be put on the user's wrist as shown in FIG. 4a, and the first electronic device 410 may include a body 411 that can be detachable from an auxiliary structural member 401 in the form of an accessory, such as a watch strap, and a docking portion 412 that can couple the separated body 411 to the second electronic device 420 to be docked with the same. The first electronic device 410 may be implemented by a glass type, ahead-mounted display (HMD) type, an earphone type, a necklace type, a footwear type, a waist belt type, an ankle band type, or a band type, which includes a detachable body and a docking portion.

According to various embodiments of the present disclosure, the first electronic device 410 may include: the body 411 that is provided to be coupled to, or detached from, the second electronic device 420; and the docking portion 412 that is installed on a portion where the body 411 is coupled to the second electronic device 420, and adopts a terminal. In addition, according to an embodiment, the first electronic device 410 may have a camera 416 provided on the side of the body 411. The body 411 of the first electronic device 410 may be coupled to, or detached from, the auxiliary structural member 401 in the form of a strap, and may be detached from the auxiliary structural member 401 to then be mounted on the second electronic device 420. The auxiliary structural member 401 may have a docking space 402 into which the body 411 of the first electronic device 410 is docked, and docking protrusions 403 that are provided on either side of the docking space 402 to be engaged with docking grooves 413 of the docking portion 412 of the body 411. In addition, a detachment button 404 is provided in order to retract the docking protrusions 403 for the detachment of the body 411. According to various embodiments, the auxiliary structural member 401 may be configured in the form of an accessory, such as a necklace, which may have a body that provides a docking space so as to enable the coupling and detachment of the body 411. According to various embodiments, the body 411 of the first electronic device 410 and the auxiliary structural member 401 may have various forms and docking structures.

A representative example of the second electronic device 420, according to various embodiments of the present disclosure, may be a drone in the form of a quad copter, which is able to hover in the air by driving four rotors 428 provided therein as shown in FIG. 4b. In addition, the second electronic device 420 may be a device that has a more limited interface and memory than the first electronic device 410, and may be controlled by a low performance processor that has less computing capacity. The second electronic device 420 may be implemented by the plane type of drone, the vehicle type of drone, the vessel type of drone, the submarine type of drone, or an animal type of drone that imitates the shape and motion of a specific animal, which is able to be controlled by a low performance processor.

According to various embodiments, the second electronic device 420 may include: a body 421; a docking space 422 that is formed on the upper side of the body 421 in order to be docked with the body 411 of the first electronic device 410; docking protrusions 423 that are formed on either side of the docking space 422 in order to be engaged with the docking grooves 413 of the docking portion 412 of the body 411; and a terminal 425 that comes into contact with the terminal of the first electronic device 410 when the first electronic device 410 is docked into the docking space 422. In addition, according to an embodiment, the second electronic device 420 may include only the basic elements necessary for the operation of the second electronic device 420. The basic elements may include: a relatively low performance controller that has less computing capacity, and a more limited interface and memory than the first electronic device 410; a driver; and a driving controller that controls the driver. According to various embodiments, the terminal 425 of the second electronic device 420 may include a terminal that is provided based on a micro-USB or pogo communication. According to various embodiments, the terminal 425 of the second electronic device 420 may include a UART (universal asynchronous receiver transmitter) serial communication interface.

Figure 5A:
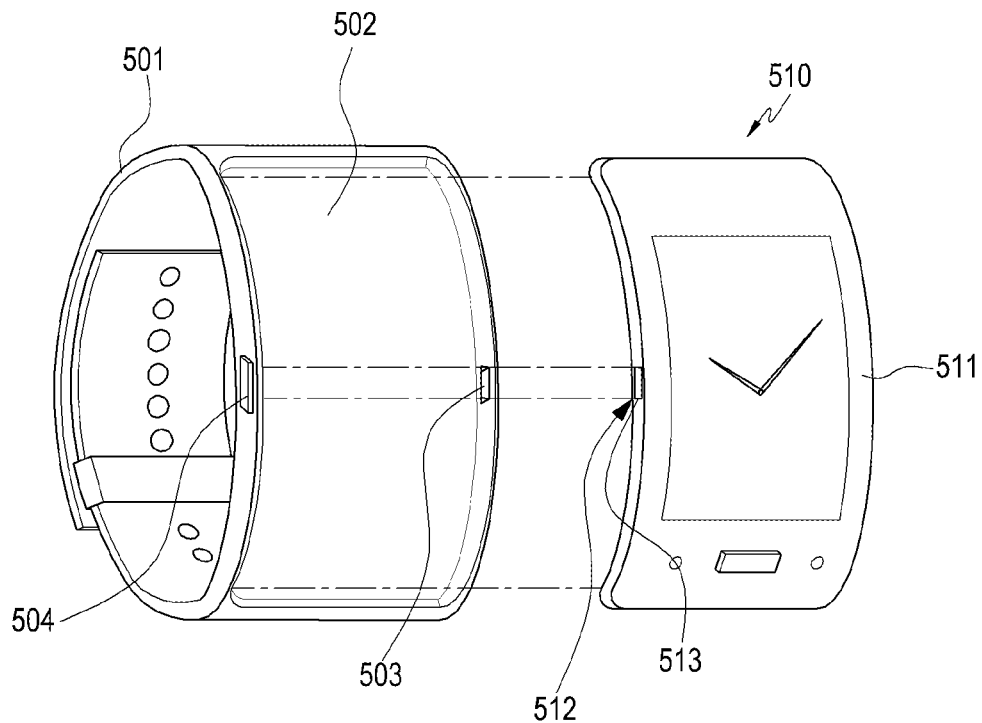
FIG. 5a is another perspective view illustrating an electronic device according to various embodiments of the present disclosure.
Figure 5B:
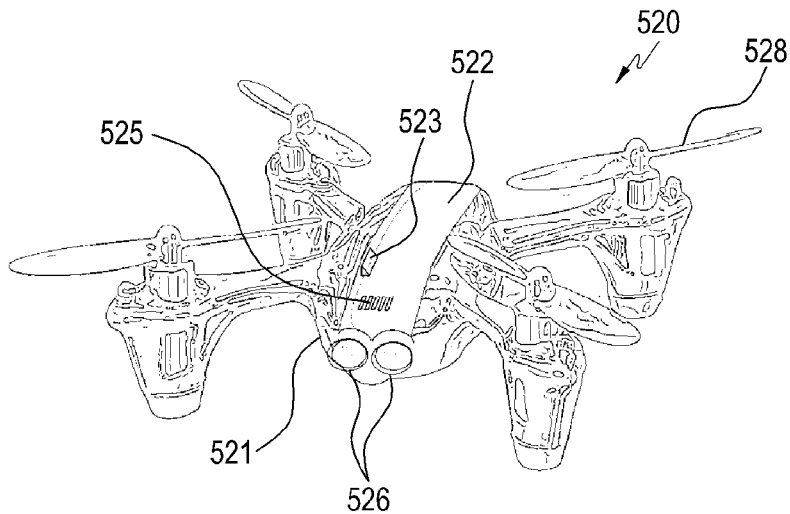
FIG. 5b is another perspective view illustrating an electronic device that is coupled to another electronic device according to various embodiments of the present disclosure.

FIG. 5a is another perspective view illustrating an electronic device, according to various embodiments of the present disclosure, and FIG. 5b is another perspective view illustrating an electronic device that is coupled to another electronic device according to various embodiments of the present disclosure.

Referring to FIG. 5a and FIG. 5b, the first electronic device 510 and the second electronic device 520, according to another embodiment of the present disclosure, may have substantially the same configuration as the first electronic device 410 or the second electronic device 420 according to the embodiment above.

The first electronic device 510, according to various embodiments of the present disclosure, may be the wristwatch type of device that can be worn on the user's wrist, and may have a different design from the first electronic device 410 of the embodiment above, as shown in FIG. 5a. The first electronic device 510 may include a body 511 that can be detachable from an auxiliary structural member 501 in the form of an accessory, such as a watch strap, and a docking portion 512 that can couple the separated body 511 to the second electronic device 520 to be docked with the same.

According to various embodiments, the first electronic device 510 may include: the body 511 that is provided to be coupled to, or detached from, the second electronic device 520; and the docking portion 512 that is formed on a portion where the body 511 is coupled to the second electronic device 520, and adopts a terminal. In addition, according to another embodiment, the first electronic device 510 may not have a camera in the body 511. The body 511 of the first electronic device 510 may be coupled to, or detached from, the auxiliary structural member 501 in the form of a strap, and may be detached from the auxiliary structural member 501 to then be mounted on the second electronic device 520. The auxiliary structural member 501 may have a docking space 502 into which the body 511 of the first electronic device 510 is docked, and docking protrusions 503 that are provided on either side of the docking space 502 to be engaged with docking grooves 513 of the docking portion 512 of the body 511. In addition, a detachment button 504 is provided in order to retract the docking protrusions 503 for detachment of the body 511. According to various embodiments, the body 511 of the first electronic device 510 and the auxiliary structural member 501 may have various forms and docking structures.

The second electronic device 520, according to various embodiments of the present disclosure, may be a drone in the form of a quad copter, which is able to hover in the air by driving four rotors 528 provided therein as shown in FIG. 5b. In addition, the second electronic device 520 may be differently designed from the second electronic device 410 of the embodiment above.

According to various embodiments, the second electronic device 520 may include: a body 521; a docking space 522 that is formed on the upper side of the body 521 in order to be docked with the body 511 of the first electronic device 510; docking protrusions 523 that are formed on either side of the docking space 522 in order to be engaged with the docking grooves 513 of the docking portion 512 of the body 511; and a terminal 425 that comes into contact with the terminal of the first electronic device 510 when the first electronic device 510 is docked into the docking space 522. In addition, according to another embodiment, the second electronic device 520 may include basic elements necessary for the operation of the second electronic device 520 and a camera 526 that is provided on the side of the body 521. According to various embodiments, the camera 526 of the second electronic device 520 may be implemented by a dual-camera that can photograph 3D images. In addition, the terminal 425 of the second electronic device 520 may include a terminal that is provided based on a micro-USB or pogo communication. According to various embodiments, the terminal 425 of the second electronic device 520 may include a UART (universal asynchronous receiver transmitter) serial communication interface.

Figure 6:
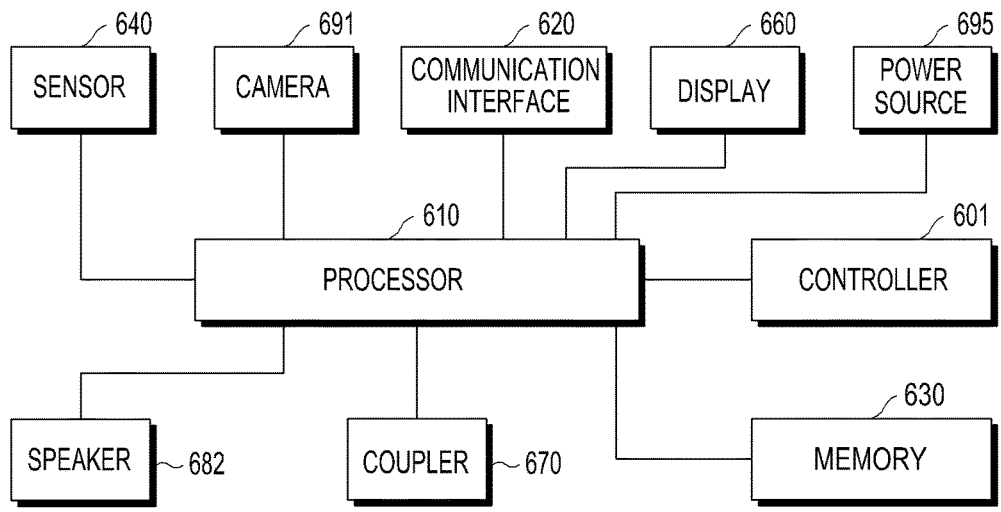
FIG. 6 is a block diagram showing a configuration of an electronic device according to various embodiments of the present disclosure.
Figure 7:
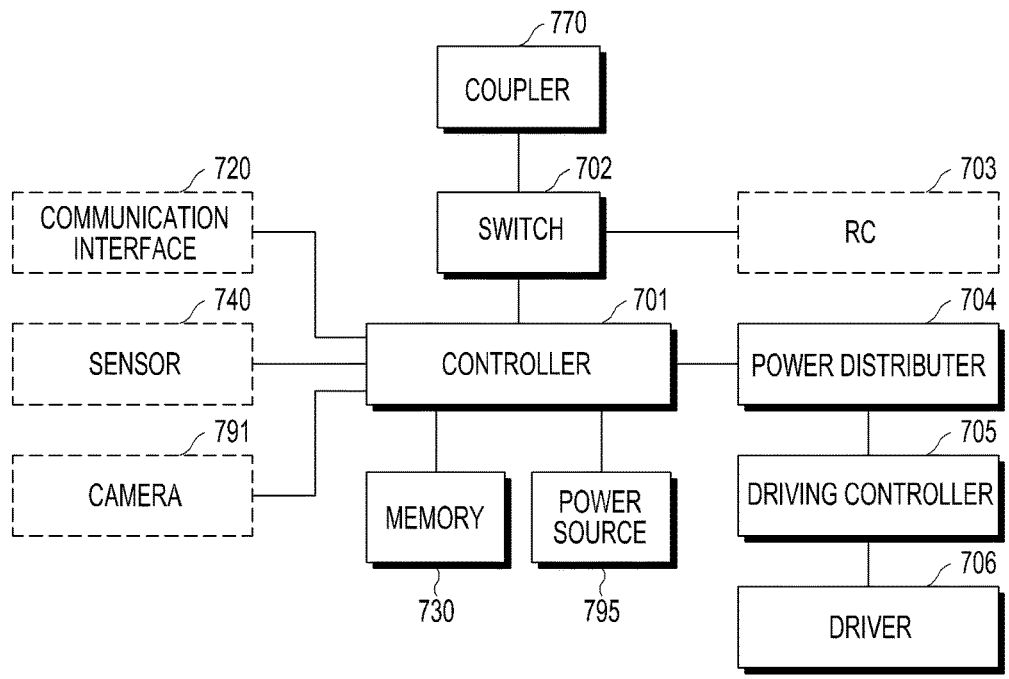
FIG. 7 is a block diagram showing another configuration of an electronic device according to various embodiments of the present disclosure.

FIG. 6 is a block diagram showing a configuration of an electronic device according to various embodiments of the present disclosure, and FIG. 7 is a block diagram showing another configuration of an electronic device according to various embodiments of the present disclosure.

Referring to FIG. 6, the first electronic device may include a processor 610, a communication interface 620, a memory 630, a sensor 640, a display 660, a coupler 670, a speaker 682, a camera 691, a power source 695, and a controller 601. The first electronic device, for example, may include all or some of the elements of the electronic device 201 shown in FIG. 2. The elements of the first electronic device may be implemented in real applications by combining two or more elements into a single element or by dividing a single element into two or more elements.

The processor 610 may control the overall operations of the first electronic device and the operations of the other elements (e.g., the communication interface 620, the memory 630, the sensor 640, the display 660, the coupler 670, the speaker 682, the camera 691, the power source 695, or the controller 601.

The communication interface 620 may make a communication session with other electronic devices in order to thereby perform data communication. For example, the communication interface 620 may be connected to the network through wireless communication in order to thereby communicate with other electronic devices. The wireless communications, for example, may include at least one of WiFi (Wireless Fidelity), Bluetooth (Bluetooth), NFC (near field communication), or a GNSS (global navigation satellite system), or cellular communications {for example: LTE (long-term evolution), LTE-A (LTE Advance), CDMA (code division multiple access), WCDMA (wideband CDMA), a UMTS (universal mobile telecommunication system), WiBro (Wireless Broadband), or a GSM (Global System for Mobile Communications)}. In addition, the communication interface 620 may support wired communication that includes at least one of communication that uses a pogo pin by a physical contact terminal through the coupler 670, a USB (universal serial bus), an HDMI (high definition multimedia interface), a UART (universal asynchronous receiver transmitter), RS-232 (recommended standard 232), or a POTS (plain old telephone service).

The memory 630 may store programs for the process and control of the controller 601, and may perform a function of storing input/output data.

The sensor 640 may include an acceleration sensor, a gyro sensor, a pressure sensor, an ultrasonic sensor, an image sensor, a gesture sensor, a magnetic sensor, a proximity sensor, a biometric sensor, a temperature/humidity sensor, an illuminance sensor, a UV (ultra violet) sensor, an E-nose sensor, an EMG (electromyography) sensor, an EEG (electroencephalogram) sensor, an ECG (electrocardiogram) sensor, an IR (infrared) sensor, an iris sensor, and/or a fingerprint sensor.

The display 660 may display images or videos, which are: received from the camera 691 or the communication interface 620 of the first electronic device; stored in the memory 630; or received from the second electronic device that is docked. In addition, the display 660 may display a variety of information that is processed by the first electronic device. For example, when the first electronic device is in a phone-call mode, the display 660 may display a user interface (UI) or a GUI (Graphic User Interface) related to the phone-call. According to various embodiments, the display 660 may display a user interface for controlling the second electronic device that is docked.

The coupler 670 may include a terminal that comes into physical contact with the corresponding terminal of the second electronic device that is docked. In addition, the coupler 670 may provide data that received through the terminal to the controller 601. Accordingly, the controller 601 may check the data provided through the terminal of the coupler 670 in order to thereby identify the coupling of the second electronic device, and in order to thereby determine the basic performance of the second electronic device.

The speaker 682 may output sounds. According to various embodiments, the speaker 682 may be used to support the sounds of application functions that are associated with the second electronic device that is docked.

The camera 691 may photograph still and moving images, and for example, may include one or more image sensors, lenses, an ISP (image signal processor), or a flash (example: LEDs or xenon lamps). According to various embodiments, the camera 691 may be used to support the photographing of the application functions associated with the second electronic device that is docked.

The power source 695 may provide the power necessary for driving the elements included in the first electronic device, and may include, for example, a battery. In addition, the power source 695 may include a charging control circuit that applies the power supplied from the outside to the battery to then be charged.

The controller 601 may be provided separately from the processor 610, or may be integrated, at least in part, into the processor. The controller 601 may: provide signals or instructions necessary for controlling the operation of the elements in the first electronic device; provide data that is created during the operation of the first electronic device; and receive information necessary for the operation of the first electronic device.

The controller 601, according to various embodiments of the present disclosure, may: identify the coupling to the second electronic device by docking; determine the basic performance of the second electronic device; determine the extended performance that can be provided by the first electronic device based on the basic performance of the second electronic device; and control the second electronic device according to the basic performance of the second electronic device and the extended performance.

According to various embodiments, the controller 601 may identify data that is provided through the coupler 670 that comes into contact according to the coupling to the second electronic device by docking in order to thereby identify whether or not the first electronic device is coupled to the second electronic device. The data provided from the second electronic device may contain at least one of type information, identification information, the type of each element, or the performance of each element of the second electronic device. In addition, when the coupling of the second electronic device is identified, the controller 601 may perform authentication for the second electronic device. This operation may be performed when the second electronic device is shared with other users and the security is required because the application function associated with the second electronic device, which is docked, is used for security.

According to various embodiments, the controller 601 may identify the data provided by the second electronic device, which is docked, in order to thereby determine the basic performance of the second electronic device. For example, the controller 601 may identify type information on the second electronic device, which is contained in the data. Here, the type information may show that the second electronic device is at least one of the plane type, the vehicle type, the vessel type, the submarine type, or the animal type imitating the shape and motion of a specific animal. In addition, the type information may contain identification information, such as the model name or the serial number of the second electronic device, or may be replaced by the same. For example, the controller 601 may determine the basic performance of the second electronic device by using the type information. For example, the controller 601 may identify the type and performance of each element of the second electronic device according to the type information that is pre-stored in the memory 630 or is registered in the external server through the communication interface 620 in order to thereby determine the basic performance of the second electronic device. As another example, the controller 601 may identify the type and performance of each element of the second electronic device, which are contained in the data together with the type information of the second electronic device, in order to thereby determine the basic performance of the second electronic device.

According to various embodiments, when the basic performance of the second electronic device that is docked is determined, the controller 601 may determine the extended performance that can be provided by the first electronic device based on the determined basic performance of the second electronic device. The controller 601 may compare the determined basic performance of the second electronic device with the performance of the first electronic device, which is pre-stored in the memory 630, in order to thereby determine the extended performance by using at least one of the additional performance or the replacement performance, which can be provided by the first electronic device. For example, in the case where the element of the second electronic device is comprised of only the driver, the additional performance provided by the first electronic device may be a function of the communication interface 620, a function of the sensor 640, or a function of the camera 691. In addition, in the case where the elements of the second electronic device are comprised of the driver and the camera, the performance of the camera of the first electronic device may be compared with the performance of the camera of the second electronic device, and if the performance of the camera of the first electronic device is relatively good, the camera of the first electronic device may be determined as the replacement performance that can be provided by the first electronic device.

According to various embodiments, when the basic performance of the second electronic device that is docked and the extended performance are determined, the controller 601 may control the second electronic device by using the first electronic device according to the basic performance of the second electronic device and the extended performance. The controller 601 may: discover one or more applications that can be supported according to the basic performance of the second electronic device and the extended performance; select one or more applications from among the one or more discovered applications; and control the second electronic device by using the selected applications. For example, the controller 601 may determine the supportable applications according to the basic performance of the second electronic device. For example, if the basic performance of the second electronic device corresponds to the airplane type of drone, the controller 601 may display the applications that can be supported in the airplane type of drone while excluding other applications that cannot be supported by the airplane type of drone.

As another example, the controller 601 may: access an external server through the communication interface 620; transmit a query about the basic performance of the second electronic device and the extended performance to the external server; receive a discovery result of the applications that can be supported according to the basic performance of the second electronic device and the extended performance; and display the same. As another example, the controller 601 may display the discovery result of the supportable applications according to the basic performance of the second electronic device and the extended performance by using application information that is pre-stored in the memory 630. According to various embodiments, the discovered applications may be displayed in the form of an icon or URL on the display 660. In addition, when one or more applications are selected from among the discovered applications, the controller 601 may display a user interface for controlling the second electronic device by the selected applications on the display 660. Here, the user interface may be created by using at least one piece of information on the basic performance of the second electronic device and the extended performance, information on the applications that are selected for the control of the second electronic device, or data information that is obtained from at least one of the first electronic device or the second electronic device. Then, the controller 601 may configure options for the control of the second electronic device through the user interface. A default option may be configured according to the basic performance of the second electronic device and the extended performance, and the user may change the option through the user interface. For example, the option may contain the configuration of the on/off-state of the display 660, the detailed configuration of the camera 691 (the on/off-state of a flash function), the configuration of the on/off-state of an event function, such as phone-calls, text, messages, or notification to the first electronic device, and the configuration to display a specific image on the display 660.

According to various embodiments, the controller 601 may configure the third electronic device that shares the user interface of the first electronic device through the communication interface 620, and may provide the user interface for the control of the second electronic device to the third electronic device. The controller 601 may provide the third electronic device with at least one piece of the information on the basic performance of the second electronic device and the extended performance, the information on the applications that are selected for the control of the second electronic device, or the data information that is obtained from at least one of the first electronic device or the second electronic device. For example, the controller 601 may provide image streams that are obtained through the camera of the first electronic device or the second electronic device to the third electronic device to then be displayed through the display of the third electronic device. At this time, the third electronic device, which shares the user interface of the first electronic device, may automatically execute the application that is selected to control the second electronic device, and a user interface provided by the application may be used to remotely control the second electronic device. In addition, the third electronic device may configure the options necessary for the control of the second electronic device through the application selected for the control of the second electronic device. According to various embodiments, the application for the control of the second electronic device may provide various application functions. For example, the application may provide a flight driving function of the second electronic device that is docked with the first electronic device and a selfie function by using the camera of the first electronic device or the second electronic device, and may display the image streams obtained through the camera on the display of the third electronic device.

As another example, the application may: provide a flight driving function of the second electronic device that is docked with the first electronic device and an AR (Augmented Reality) game function by using the camera of the first electronic device or the second electronic device; display, on the display of the third electronic device, game images that are made by adding game elements to the image streams obtained through the camera; and output a game sound through the speaker 682 of the first electronic device. As another example, the application may provide a flight driving function of the second electronic device that is docked with the first electronic device and an indoor security function by using the camera of the first electronic device or the second electronic device. According to this, the second electronic device, which is in indoor flight operation, may be controlled to photograph indoor images in different locations through the third electronic device, and the image streams obtained through the camera may be displayed on the display of the third electronic device in order to thereby identify the indoor security state.

According to various embodiments, the third electronic device may be an electronic device that adopts a communication function. For example, the third electronic device may include at least one of a smart phone, a tablet personal computer (PC), a mobile phone, a video phone, an e-book reader, a desktop PC, a laptop PC, a netbook computer, a workstation, a server, a PDA (personal digital assistant), a PMP (portable multimedia player), an MP3 player, mobile medical equipment, a camera, or wearable devices (for example, smart glasses, a head-mounted device (HMD), electronic clothing, an electronic bracelet, an electronic necklace, an appcessory, an electronic tattoo, a smart mirror, or a smart watch).

Referring to FIG. 7, the second electronic device may include, as basic elements, a controller 701, a switch 702, a power distributer 704, a driving controller 705, a driver 706, a memory 730, a power source 795, and a coupler 770. The basic elements of the second electronic device may have a more limited interface and memory 730 than the first electronic device 410, and may be controlled by a low performance processor 701 that has less computing capacity.

The coupler 770 may include a terminal that comes into contact with the corresponding terminal of the first electronic device that is docked. In addition, the coupler 770 may provide the data on the second electronic device to the first electronic device through the terminal.

The switch 702 may make a switch such that the function of the second electronic device is replaced by the function of the first electronic device when the first electronic device is coupled to the second electronic device by docking. For example, when the second electronic device is not docked with the first electronic device, the switch 702 may select an RC 703 in order to thereby control the flight operation through the RC 703. In addition, when the second electronic device is docked with the first electronic device, the switch 702 may select the first electronic device in order to thereby control the flight operation through the first electronic device.

The power distributer 704 may convert the power supplied from the power source 795 into the power suitable for the driving of the driver 706, and the driving controller 705 may control the operation of the driver 706. In addition, the driver 706 may provide a driving force under the control of the driving controller 705.

The second electronic device may further include a communication interface 720, a sensor 740, and a camera 791 in addition to the basic elements.

The communication interface 720 may support wired communication that includes at least one of communication that uses a pogo pin by a physical contact terminal through the coupler 770, a USB, an HDMI, a UART, RS-232, or a POTS. In addition, the communication interface 720 may include a short-range communication, such as Bluetooth, NFC, RFID, BLE, Wifi-Direct, or the like.

The sensor 740 may include an acceleration sensor, a gyro sensor, a pressure sensor, an ultrasonic sensor, an image sensor, or an IR sensor, which is required for the autonomous flight control of the second electronic device. According to various embodiments, the sensor 740 may include a laser detection sensor for the accurate measurement of a distance.

The camera 791 may photograph still and moving images, and, for example, may include one or more image sensors, lenses, an ISP (Image Signal Processor), or a flash (e.g., LEDs or xenon lamps). According to various embodiments, the camera 791 may be implemented by a dual-camera that can photograph 3D images.

Figure 8:
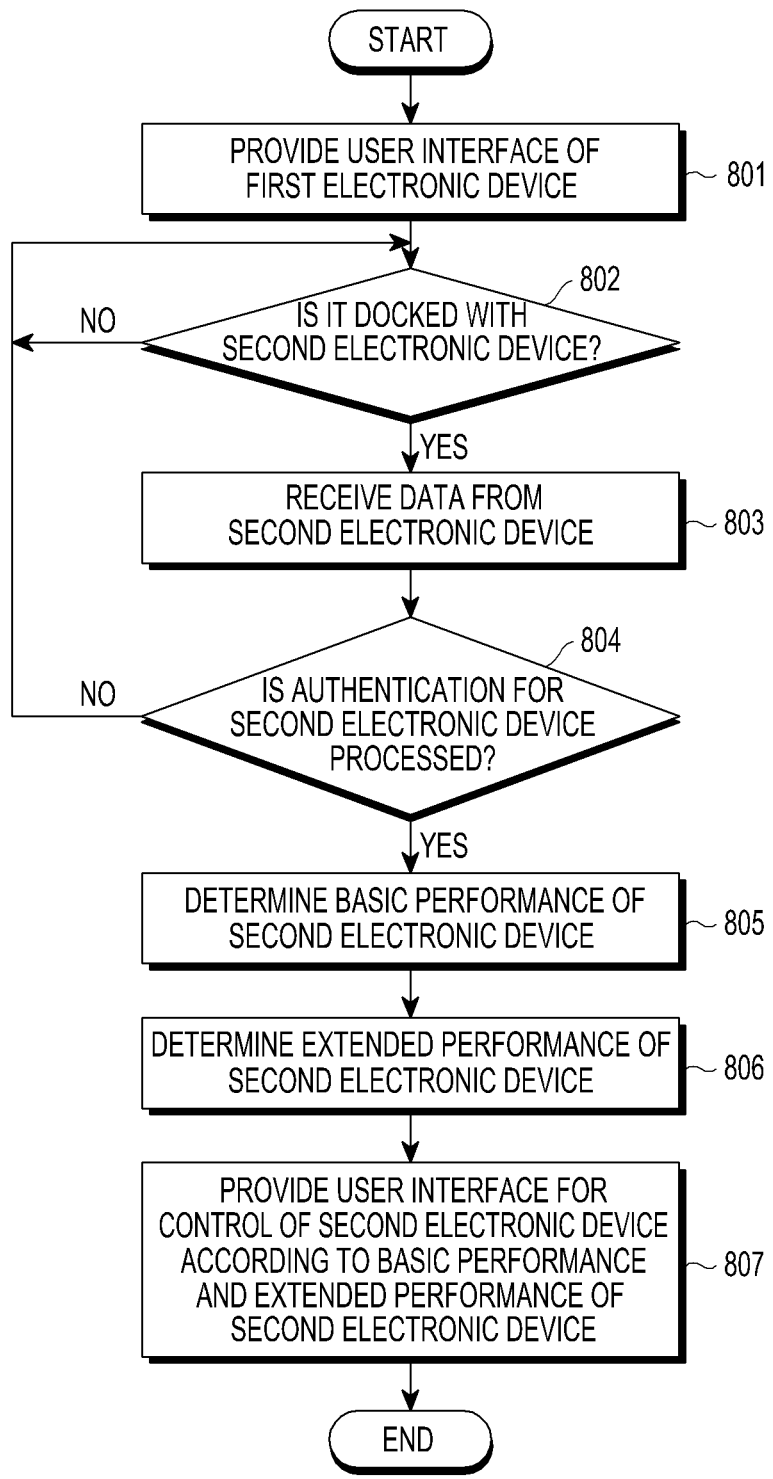
FIG. 8 is a flowchart illustrating a method of controlling an electronic device according to various embodiments of the present disclosure.
Figure 9:
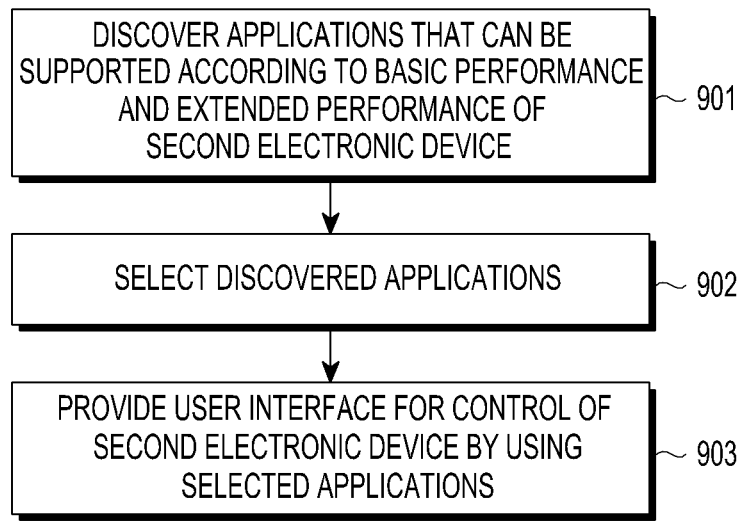
FIG. 9 is a flowchart illustrating another method of controlling an electronic device according to various embodiments of the present disclosure.
Figure 10:
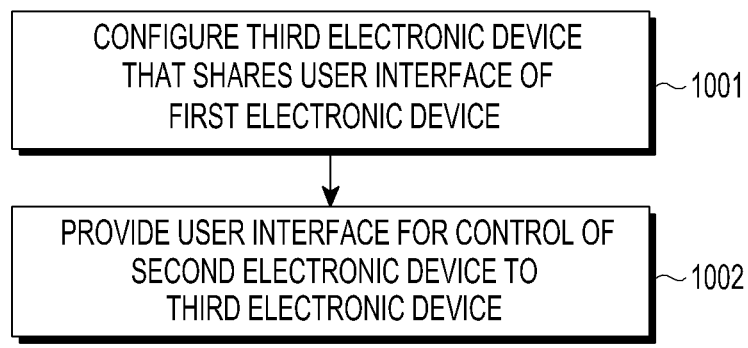
FIG. 10 is a flowchart illustrating yet another method of controlling an electronic device according to various embodiments of the present disclosure.

FIG. 8 is a flowchart illustrating a method of controlling an electronic device according to various embodiments of the present disclosure, and FIG. 9 is a flowchart illustrating another method of controlling an electronic device according to various embodiments of the present disclosure. FIG. 10 is a flowchart illustrating yet another method of controlling an electronic device according to various embodiments of the present disclosure, and FIGS. 11A and B illustrate examples of a user interface for controlling an electronic device according to various embodiments of the present disclosure.

Hereinafter, the operation in which the first electronic device, according to various embodiments of the present disclosure, controls the operation of the second electronic device will be described in detail with reference to FIG. 8 to FIG. 11B.

In operation 801, the first electronic device may provide a user interface that provides basic functions of the first electronic device.

In operation 802, the first electronic device may be coupled to the second electronic device by docking with the same, and may identify the coupling of the second electronic device. The first electronic device may identify the data provided through the terminal that comes into contact according to the coupling of the second electronic device by docking in order to thereby recognize whether or not the second electronic device is coupled.

In operation 803, the first electronic device may receive information on the second electronic device according to the coupling of the second electronic device by docking. The data provided from the second electronic device may contain at least one of type information, identification information, the type of each element, or the performance of each element of the second electronic device.

In operation 804, the first electronic device may perform authentication for the second electronic device. This operation may be performed when the second electronic device is shared with other users and the security is required because the application function associated with the second electronic device, which is docked, is used for security.

In operation 805, the first electronic device may identify the data that is provided from the second electronic device that is docked in order to thereby determine the basic performance of the second electronic device. For example, the first electronic device may determine the basic performance of the second electronic device by using the type information of the second electronic device, which is contained in the data. For instance, the first electronic device may identify the type of each element and the performance of each element of the second electronic device, which are pre-stored in the memory of the first electronic device, or by using the type information that is registered in the external server through the communication, in order to thereby determine the performance of the second electronic device.

As another example, the first electronic device may identify the type of each element and the performance of each element of the second electronic device, which are contained in the data together with the type information of the second electronic device, in order to thereby determine the basic performance of the second electronic device.

In operation 806, the first electronic device may determine the extended performance that can be provided by the first electronic device based on the basic performance of the second electronic device that is docked. The first electronic device may compare the determined basic performance of the second electronic device with the performance of the first electronic device, and may determine the extended performance by using at least one of the additional performance and the replacement performance, which can be provided by the first electronic device. For example, in the case where the element of the second electronic device is comprised of only the driver, the additional performance provided by the first electronic device may be a communication function, a camera shooting function, or a sensing function. In addition, in the case where the elements of the second electronic device are comprised of the driver and the camera, the performance of the camera of the first electronic device may be compared with the performance of the camera of the second electronic device, and any one camera performance, which is better than the other camera performance, may be determined as the replacement performance that can be provided by the first electronic device.

In operation 807, the first electronic device may control the second electronic device by using the first electronic device according to the basic performance of the second electronic device that is docked and the extended performance, and may provide a user interface for the control of the second electronic device.

The operation in which the first electronic device controls the second electronic device that is docked may include an operation of controlling the operation of the second electronic device by the applications as shown in FIG. 9.

In operation 901, the first electronic device may discover one or more applications that can be supported according to the basic performance of the second electronic device that is docked and the extended performance. For example, the first electronic device may determine the supportable applications according to the basic performance of the second electronic device. For example, if the basic performance of the second electronic device corresponds to the airplane type of drone, the first electronic device may provide a discovery result of the applications that can be supported in the airplane type of drone while excluding other applications that cannot be supported by the airplane type of drone. As another example, the first electronic device may communicate with an external server, and may transmit a query about the basic performance of the second electronic device and the extended performance to the external server in order to thereby provide the discovery result of the applications that can be supported according to the basic performance of the second electronic device and the extended performance. As another example, the first electronic device may provide the discovery result of the supportable applications according to the basic performance of the second electronic device and the extended performance by using application information that is pre-stored.

In operation 902, the first electronic device may select one or more applications from among the discovered applications.

In operation 903, the first electronic device may display the user interface for controlling the second electronic device by the selected application. The user interface may be created by using at least one piece of information on the basic performance of the second electronic device and the extended performance, information on the applications that are selected for the control of the second electronic device, or data information that is obtained from at least one of the first electronic device or the second electronic device. In addition, the first electronic device may configure options necessary for the control of the second electronic device through the user interface. A default option may be configured according to the basic performance of the second electronic device and the extended performance, and the user may change the option through the user interface. For example, the option may contain the configuration of the on/off-state of the display, the detailed configuration of the camera 691 (the on/off-state of a flash function), the configuration of the on/off-state of an event function, such as phone-calls, text, messages, or notification to the first electronic device, or the configuration to display a specific image on the display 660.

The first electronic device may control the second electronic device that is docked by using the third electronic device as shown in FIG. 10.

In operation 1001, the first electronic device may configure the third electronic device that shares the user interface of the first electronic device.

In operation 1002, the first electronic device may provide the user interface for controlling the second electronic device to the third electronic device. At this time, the first electronic device may provide the third electronic device with at least one piece of information on the basic performance of the second electronic device and the extended performance, information on the applications that are selected for the control of the second electronic device, or data information that is obtained from at least one of the first electronic device or the second electronic device. For example, the first electronic device may provide video streams that are obtained through the camera of the first electronic device or the second electronic device to the third electronic device.

Figures 11A, 11B:
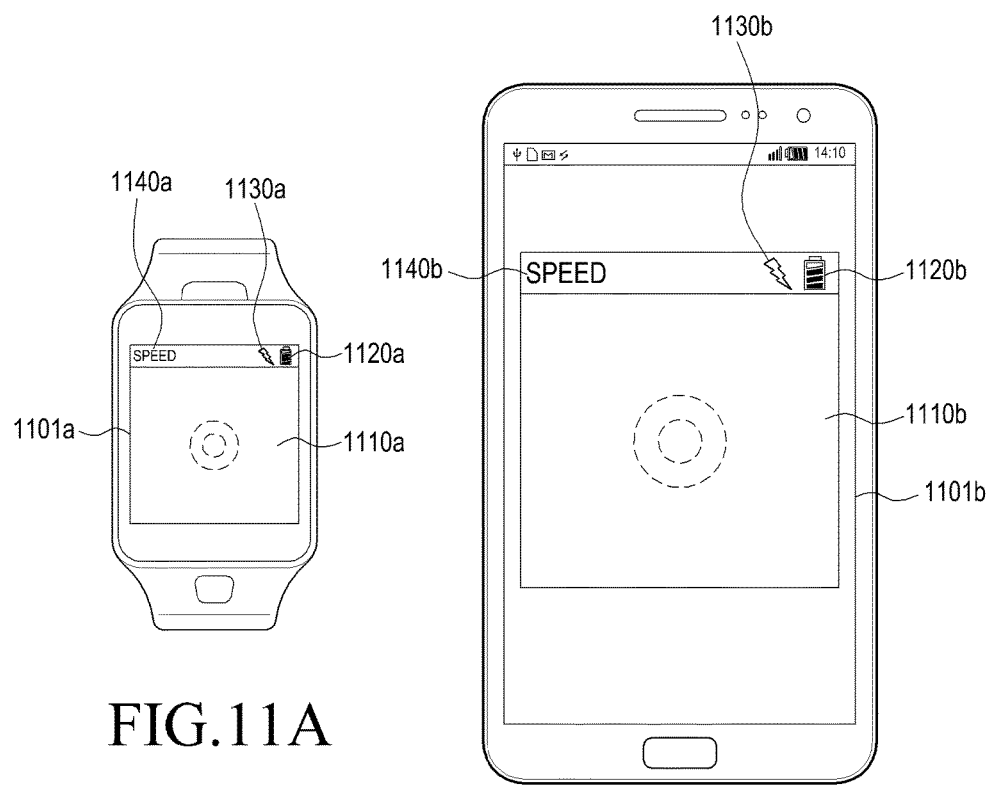
FIGS. 11A and 11B illustrate examples of a user interface for controlling an electronic device according to various embodiments of the present disclosure.

Meanwhile, the user interface for the control of the second electronic device may be displayed on the display of the first electronic device. For example, as shown in FIG. 11A, the wristwatch type of wearable electronic device may display the user interface on the whole or a part of the display 1101*a*. The user interface may display: an image view 1110*a* that displays an image stream that is photographed in the flight driving process of the second electronic device; a remaining battery level 1120*a* of the first electronic device and the second electronic device; optional items 1130*a* for the control of the second electronic device; and a speed indicator 1140*a* of the second electronic device. Here, the remaining battery level 1120*a* may display the lower battery among the batteries of the first electronic device and the second electronic device, and may provide information on available usage time according to the remaining battery level. The optional items 1130*a* may display the configuration state of the camera (for example, the configuration of a single camera or a dual camera, or the on/off-state of the flash that interworks with the camera). In addition, the speed 1140*a* may be calculated by using time information based on the location of the first electronic device and the second electronic device.

In addition, the user interface for the control of the second electronic device may be provided to be displayed on the display of the third electronic device. For example, as shown in FIG. 11B, the smart phone may display the user interface through a pop-up window on the whole screen of the display 1101*b*. The user interface may include an image view 1110*b*, a remaining battery level 1120*b*, optional items 1130*b*, or a speed indicator 1140*b*, which may be substantially the same as the description in FIG. 11A.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A first electronic device comprising:
    a body;
    a docking portion that is provided in the body, wherein the docking portion is detachably coupled to a second electronic device;
    a terminal configured to come into contact with the second electronic device according to a coupling of the first electronic device to the second electronic device; and
    a controller configured to:
        identify the coupling of the first electronic device to the second electronic device;
        determine a basic performance of the second electronic device;
        compare the determined basic performance of the second electronic device with a basic performance of the first electronic device;
        determine an extended performance that is provided by the first electronic device based on a result of the comparison, the extended performance being a function of the first electronic device associated with a function of the second electronic device, wherein the function of the first electronic device is performed by at least one of a sensor or camera of the first electronic device, and the function of the second electronic device comprises a driving function of the second electronic device; and
        control the second electronic device using the first electronic device according to the basic performance of the second electronic device and the extended performance of the first electronic device.

2. The first electronic device of claim 1, wherein the controller is further configured to identify data that is provided by the terminal that comes into contact with the second electronic device according to the coupling of the first electronic device to the second electronic device.

3. The first electronic device of claim 2, wherein the data contains at least one of type information, identification information, a type of each element, or a performance of each element of the second electronic device.

4. The first electronic device of claim 1, wherein the controller is further configured to perform an authentication for the second electronic device.

5. The first electronic device of claim 1, wherein the controller is further configured to:
    discover one or more applications that are supported according to the basic performance of the second electronic device and the extended performance of the first electronic device;
    select one or more applications from the discovered one or more applications; and
    control the second electronic device using the selected one or more applications.

6. The first electronic device of claim 1, wherein the controller is further configured to:
    configure a third electronic device that shares a user interface of the first electronic device, and
    provide the user interface for controlling the second electronic device to the third electronic device.

7. The first electronic device of claim 6, wherein the user interface is created using at least one of the basic performance of the second electronic device and the extended performance of the first electronic device, information on one or more applications that are selected for controlling the second electronic device, or data information that is obtained from at least one of the first electronic device or the second electronic device.

8. The first electronic device of claim 1, further comprising:
    an auxiliary structural body that is detachably coupled to the body; and
    a docking portion that is provided in the auxiliary structural body, wherein the docking portion is coupled to the body.

9. The first electronic device of claim 1, wherein the first electronic device is a wearable electronic device and the second electronic device is a drone device.

10. A second electronic device comprising:
    a body;
    a docking portion that is provided in the body, wherein the docking portion is detachably coupled to a first electronic device;
    a terminal configured to come into contact with the second electronic device according to a coupling of the first electronic device to the second electronic device; and
    a controller configured to:
        provide data to the first electronic device through the terminal that comes into contact with the second electronic device according to the coupling of the first electronic device to the second electronic device; and
        control the second electronic device using the first electronic device according to a basic performance of the second electronic device and an extended performance of the first electronic device, wherein the extended performance that is provided by the first electronic device is determined based on a result of comparing the basic performance of the second electronic device with a basic performance of the first electronic device, the extended performance being a function of the first electronic device associated with a function of the second electronic device, wherein the function of the first electronic device is performed by at least one of a sensor or camera of the first electronic device, and the function of the second electronic device comprises a driving function of the second electronic device.

11. The second electronic device of claim 10, wherein the data contains at least one of type information, identification information, a type of each element, or a performance of each element of the second electronic device.

12. A third electronic device comprising:
    a communication interface configured to perform a communication session with a first electronic device for a data communication; and
    a controller configured to receive, from the first electronic device, a user interface for controlling a second electronic device according to a basic performance of the second electronic device that is coupled to the first electronic device and an extended performance of the first electronic device, wherein the extended performance that is provided by the first electronic device is determined based on a result of comparing the basic performance of the second electronic device with a basic performance of the first electronic device, the extended performance being a function of the first electronic device associated with a function of the second electronic device, wherein the function of the first electronic device is performed by at least one of a sensor or camera of the first electronic device, and the function of the second electronic device comprises a driving function of the second electronic device.

13. The third electronic device of claim 12, wherein the user interface is created using at least one of information on applications that are selected to control the second electronic device, or data information that is obtained from at least one of the first electronic device or the second electronic device.

14. A method of a first electronic device, the method comprising:
   identifying a coupling of the first electronic device to a second electronic device;
   determining a basic performance of the second electronic device;
   comparing the determined basic performance of the second electronic device with a basic performance of the first electronic device;
   determining an extended performance that is provided by the first electronic device based on a result of the comparison, the extended performance being a function of the first electronic device associated with a function of the second electronic device, wherein the function of the first electronic device is performed by at least one of a sensor or camera of the first electronic device, and the function of the second electronic device comprises a driving function of the second electronic device; and
   controlling the second electronic device using the first electronic device according to the basic performance of the second electronic device and the extended performance of the first electronic device.

15. The method of claim 14, further comprising identifying data that is provided by a terminal that comes into contact with the second electronic device according to the coupling of the first electronic device to the second electronic device.

16. The method of claim 15, wherein the data contains at least one of type information, identification information, a type of each element, or a performance of each element of the second electronic device.

17. The method of claim 14, further comprising performing an authentication for the second electronic device.

18. The method of claim 14, further comprising:
   discovering one or more applications that are supported according to the basic performance of the second electronic device and the extended performance of the first electronic device;
   selecting one or more applications from the discovered one or more applications; and
   controlling the second electronic device using the selected one or more applications.

* * * * *